United States Patent [19]

Osborne et al.

[11] 3,911,140
[45] Oct. 7, 1975

[54] PREPARATION OF CONCENTRATED STARTER CULTURES

[75] Inventors: Raymond John Walcot Osborne, Sutton; Anthony Thomas Miles, Ashford; Nicholas Tilley, Rosedale Abbey, all of England

[73] Assignee: Milk Marketing Board, England

[22] Filed: July 2, 1973

[21] Appl. No.: 375,935

[52] U.S. Cl. .................... 426/36; 195/96; 195/115; 195/117; 195/118; 195/119; 426/43; 426/61
[51] Int. Cl.$^2$.. A23C 9/12; A23C 19/02; C12K 3/00
[58] Field of Search ............ 195/96, 115, 117, 118, 195/119; 426/37, 43, 61, 34, 16

[56] References Cited
UNITED STATES PATENTS

| | | | |
|---|---|---|---|
| 3,159,490 | 12/1964 | Hussong et al. .................. | 195/96 X |
| 3,425,839 | 2/1969 | Pinnegar ............................. | 426/16 |

*Primary Examiner*—David M. Naff
*Attorney, Agent, or Firm*—Cushman, Darby & Cushman

[57] ABSTRACT

Concentrated starter cultures are prepared directly without centrifugation by propagating starter microorganisms in a fermenter wherein a dialysis membrane separates a culture medium containing the propagating microorganisms from a regenerating solution containing nutrients for the microorganisms. During propagation, lactic acid passes from the microorganinisms to the regenerating solution to keep the concentration of lactic acid below its inhibitory concentration and nutrients pass from the regenerating solution to the culture medium. By recirculating the culture medium in contact with the membrane, there are obtained at least $5 \times 10^{10}$ organisms per ml. in the culture medium.

10 Claims, 1 Drawing Figure

U.S. Patent  Oct. 7, 1975  3,911,140
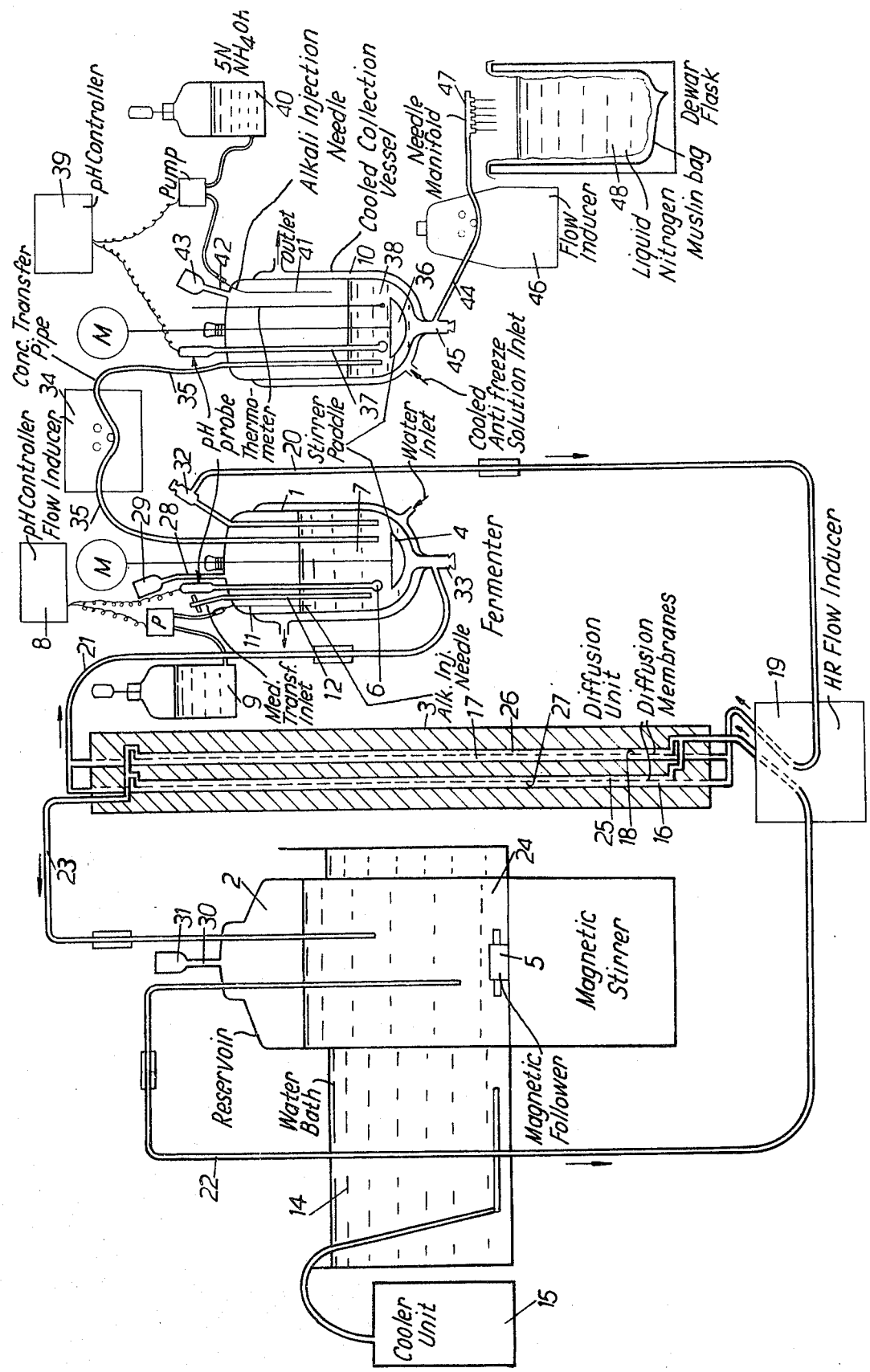

PREPARATION OF CONCENTRATED STARTER CULTURES

This invention relates to the cultivation of cheese starter organisms and is particularly concerned with a process in which the cell concentration of the micro-organism can be increased substantially in excess of the concentration attainable by conventional fermentation processes.

One of the preliminary steps in cheese manufacture involves the inoculation of large volumes of milk with a so-called cheese starter organism. These are lactic acid-producing micro-organisms such as *Streptococcus cremoris*, *Streptococcus lactis* and *Streptococcus diacetylactis*, which convert lactose in the milk into lactic acid.

The number of viable cheese starter organism cells that can be produced by conventional fermentation techniques is limited because lactic acid is produced quite rapidly by the organisms during the exponential phase of growth and this lactic acid is inhibitory to further growth of the micro-organism. The consequence of this is that it is not possible in normal starter production to produce cell concentrations in excess of about $10^9$ per ml and this means that in commercial cheese manufacture, the volume of the starter used has to be large e.g. 10 – 20 gallons of bulk starter per 1000 gallons of cheese milk. Ideally, one would like to be able to use a smaller volume of inoculum, not only to facilitate handling during the inoculation of each batch of milk, but also to make it practical to utilise a cheese starter organism of constant characteristics so that batches of inoculum can be stored for subsequent use and transported about the country.

In an effort to overcome the problem of the large volume of inoculum and the inability of conventional fermentation techniques to produce an inoculum of sufficient concentration, it has been proposed to concentrate the products of conventional fermentation by centrifugation which can give cell densities of up to about $10^{11}$/ml but special centrifuges and techniques are required to avoid contamination of the concentrated product.

We have now found that it is practical to use the technique known as dialysis or diffusion culture (hereinafter called diffusion culture) for the cultivation of cheese starter organisms to produce cell concentrations of up to about $10^{11}$/ml by direct fermentation eliminating centrifugation and prolonged handling so that the resulting inoculum is of similar concentration to that produced by centrifuging and such that 200 – 500 ml of concentrated starter is sufficient for the direct inoculation of 1000 gallons of cheese milk. Alternatively, 2 – 5 g of concentrated starter may be used to inoculate a conventional 10 gallon bulk starter eliminating the normal propagation from freeze-dried ampoules.

The present invention provides a process for producing a concentrated culture of a micro-organism capable of converting lactose to lactic acid which comprises a. cultivating the micro-organism in a nutrient medium in a fermentation zone and circulating nutrient medium containing cultivated micro-organism and lactic acid or salts thereof from the fermentation zone to a first chamber of a dialyser, b. introducing a regenerating solution into a second chamber of the dialyser which is separated from the first chamber of the dialyser by a dialysis or diffusion membrane which is substantially impermeable to the micro-organism but which allows the nutrients and lactic acid and salts thereof to pass through the membrane, the regenerating solution having a concentration of nutrient which is sufficiently high and a concentration of lactic acid and salts thereof which is sufficiently low so that (i) nutrients pass across the membrane from the regenerating solution to the nutrient medium containing cultivated micro-organism and lactic acid or salts thereof and (ii) lactic acid or salts thereof pass across the membrane from the nutrient medium containing cultivated micro-organisms and lactic acid or salts thereof to the regenerating solution, c. recirculating to a fermentation zone a nutrient solution containing cultivated micro-organisms which is enriched in nutrients and depleted in lactic acid or salts thereof and d. continuing the cultivation of the micro-organism.

Lactic acid is produced quite rapidly during the exponential phase of micro-organism growth and this is inhibitory to continued micro-organism growth at the exponential rates, particularly when its concentration exceeds about 2% w/v in the nutrient. Under certain circumstances, the rate of production of lactic acid can be so great that it is not possible to remove the lactic acid across the membrane as fast as it is produced so that lactic acid will tend to accumulate in the fermentation zone and inhibit further fermentation. This is where pH control is of importance since it has been found that salts of lactic acid are not as inhibitory to further fermentation as is lactic acid itself and by monitoring a neutralising agent, for example sodium hydroxide, or more preferably, ammonium hydroxide, into the fermentation zone, it is possible to convert part of the lactic acid to a lactate salt which will eventually be removed across the membrane but, while it remains in the fermenting medium, will not inhibit growth to the extent that the free acid does. The optimum pH range is usually 6–7.

The concentrated starter produced in accordance with the present invention can be frozen, in liquid nitrogen, and can be formulated in constant volume batches, for example in syringes, or in granule form which enable an inoculum of precisely known volume to be utilised. The use in cheese making of the concentrated cell suspensions in accordance with this invention, which use provides a further aspect of the invention, enables a desirable consistency in processing and product quality to be achieved.

The dialyser used in the process of the present invention may be of a known type in which the two chambers are separated from one another by the membrane. The membrane may be a true dialysis or porous diffusion type and should be one which is substantially impermeable to the micro-organisms but allows diffusion of the desired micro-organism nutrients and lactic acid or salts thereof across it. It is preferable to use a membrane having a pore size less than about 0.5 micron, a high nutrient diffusion rate, adequate mechanical strength, and which can be sterilised, preferably by autoclaving. Membranes made from materials such as "Visking" regenerated cellulose, and "Acropor" membrane filter material, are suitable.

One chamber of the dialyser will be in liquid communication with the fermentation zone where the micro-organism is cultivated in a nutrient medium providing the necessary sources of assimilable carbon, nitrogen and other elements. This fermentation should be carried out under the normal aseptic conditions and also under controlled conditions of pH, and temperature without aeration in order that the fermentation can be optimised for the diffusion culture conditions employed. This first chamber of the dialyser will also be in liquid communication with the fermentation zone through a recirculation conduit and the nutrient medium containing cultivated micro-organism circulated continuously in the closed circuit although intermittent circulation is also possible.

The second chamber of the dialyser is supplied with the regenerating solution, conveniently from a reservoir. The regenerating solution is also conveniently circulated, intermittently or preferably continuously, in closed circuit from the reservoir through the dialyser and back to the reservoir, but attention must be paid to the fact that if this is done, lactic acid or salts thereof will accumulate in the reservoir and this could gradually adversely affect the passage of lactic acid or salts thereof across the membrane into the nutrient solution from the nutrient medium. Consequently, while it is convenient in practice to recirculate the nutrient solution to the reservoir, lactic acid or lactate salt concentration should be monitored and accumulation of excessive concentrations prevented. It is preferred that the ratio of total volume of regenerating solution used in this way to the total volume of the nutrient solution containing cultured micro-organisms be at least 10:1. The concentration of nutrients on the one hand and lactic acid or salts thereof on the other hand in the regenerating solution should be sufficiently high and low respectively so that when it is introduced into the second chamber of the dialyser, nutrients will pass across the membrane from the regenerating solution into the nutrient medium containing the micro-organisms and lactic acid or salts thereof, and, at the same time, the metabolites of the micro-organisms are removed from the nutrient medium and passed across the membrane into the regenerating solution. Passage of nutrients and lactic acid or salts thereof across the membrane is very important as this prevents the inhibition of micro-organism growth by build up of lactic acid or salts thereof or by depletion of nutrients. However, excess nutrient can itself be inhibitory to cell growth. Thus, while cell growth is inhibited by insufficient or excess nutrient, as well as by lactic acid, it is possible, by the diffusion culture technique to provide additional nutrient, continuously or intermittently, at the desired rate as nutrient is utilised by the growing micro-organism.

Thus, it will be appreciated that a careful balance must be maintained between nutrient concentration and lactic acid and lactate salt concentration in the fermenting liquid and in the regenerating liquid to provide optimal quantities of nutrient and lactic acid or salts thereof to achieve the desired high cell population at the end of the fermentation.

As indicated above, the nature of the membrane, the nutrient and lactic acid and lactate salt concentrations, pH and the ratio of volume of total regenerating solution to volume of nutrient medium containing micro-organisms are all factors which influence the fermentation and can be optimised to achieve cell populations of at least $5 \times 10^{10}$ per ml. However, it is believed that the most important parameter from this point of view is the amount of membrane area to the volume of nutrient medium, containing the micro-organism. We have found that in order for the growth of the micro-organisms of the type with which this invention is concerned to continue to give the high cell populations of the order of $10^{10}$ or $10^{11}$ cells/ml, it is important to use more membrane area in relation to the nutrient volume containing micro-organisms than has been used hitherto in diffusion culture. For best results with cheese starter organisms, we prefer to use at least 3 cm$^2$ or more preferably, at least 5 cm$^2$ of membrane per ml of nutrient medium containing micro-organisms. The upper limit of the membrane is not critical and is governed mainly by the practical problems associated with the operation of dialysers having very large membranes but we have found it possible to operate with a membrane area of the order of 12–15 cm$^2$ per ml of nutrient medium containing micro-organism.

A further parameter which influences the course of the fermentation is the rate at which the nutrient containing the micro-organism is circulated through the dialyser. In this respect, it is preferred to circulate the nutrient at more than 1 liter per minute in order to achieve maximum turbulence at the membrane surface.

The cheese starter organism which can be used in this invention can be any of those known to be capable of converting lactose to lactic acid and include *Streptococcus cremoris*, *Streptococcus lactis* and *Streptococcus diacetylactis*.

The diffusion culture in accordance with the present invention can be carried out in apparatus shown in the accompanying drawing.

The apparatus comprises generally a fermenter 1, reservoir 2, dialyser 3 and collection vessel 10. Fermenter 1 and reservoir 2 are provided with paddle stirrer 4 and magnetic stirrer 5 respectively and fermenter 1 is provided with a pH probe 6 immersed below the surface of the fermenting liquid 7 and feeds a signal to pH controller 8. Controller 8 controls an alkali reservoir 9 which can feed alkali into fermenter 1 through inlet 11 as required to maintain pH at the desired level. The fermenter has a vent 28 guarded by an air filter 29 and a medium transfer inlet 12.

Reservoir 2 contains the regenerating solution 24 and has an air vent 30 guarded by a filter 31. Reservoir 2 is immersed in water bath 14 whose temperature is controlled by cooler unit 15. Dialyser 3 has culture compartments 16, 17 and dialysate compartments 25 and 26 separated from one another by dialysis or diffusion membranes 18 and 27 respectively. Flow inducer 19 circulates the nutrient medium containing cultivated micro-organisms from fermenter 1 via valve 32 and line 20 to dialyser 3 and back to fermenter 1 through line 21 and valve 33 and nutrient solution from reservoir 2 through line 22 to dialyser 3 and then back to reservoir 2 through line 23.

A cooled collection vessel 10 communicates with fermenter 1 via flow inducer 34 and line 35. Collection vessel 10 is equipped with a paddle stirrer 36 and pH probe 37, immersed below the surface of the collected liquid 38, feeds a signal to pH controller 39. Controller 39 controls an alkali reservoir 40 which can feed alkali into collection vessel 10 through inlet 41 as required to maintain pH at the desired level. Collection vessel 10 has a vent 42 guarded by an air filter 43.

Line 44 leads from the base of collection vessel 10 through valve 45 and a flow inducer 46 to needle manifold 47 which is positioned over a liquid nitrogen bath 48 which can freeze the culture concentrate.

In operation, culture medium and an inoculum of the micro-organism to be cultivated are introduced into fermenter 1 through transfer inlet 12. pH is adjusted to the desired value at the beginning of the fermentation and fermentation is initiated. As fermentation proceeds, pH tends to fall as lactic acid is produced and excessive fall in pH is prevented by introduction of alkali to neutralise the lactic acid, alkali introduction being triggered by pH probe 6 and pH controller 8. The nutrient medium containing micro-organism and metabolites is circulated through valve 32 and line 20 by flow inducer 19 into compartments 16 and 17 of the dialyser 3 and back through line 21 and valve 33 to fermenter 1. At the same time, nutrient solution is pumped from reservoir 2 through line 22 and flow inducer 19 into compartments 25 and 26 of dialyser 3 and back through line 23 to reservoir 2. During this period, the exchange of nutrients and metabolites occurs across the membranes 18 and 27. Fermentation proceeds in a continuous manner utilising the recently introduced nutrients and maintaining pH control until the desired cell concentration is reached. The concentrated suspension of micro-organisms is then removed from the fermenter through line 35 via flow inducer 34 (or if more convenient, from any other part of the closed culture medium system) into cooled collection vessel 10. The pH of the stored concentrated culture is monitored as in fermenter 1 by pH probe 6 and if further alkali is necessary, this is introduced by pH controller 39 from reservoir 40 through needle 41. The collected concentrated suspension of micro-organisms can be frozen by removal from vessel 10 through valve 45 line 44 and flow inducer 46 and passage through needle manifold 47 into a bath of liquid nitrogen 48. The above description refers to the continuous circulation of culture fluid and nutrient fluid but is is also possible to operate in accordance with the present invention by utilising intermittent circulation of either or both of the culture media and the nutrient.

The following Examples are given to illustrate the invention.

EXAMPLE 1

This example is carried out in apparatus substantially as described in the accompanying drawing. The following materials were used.

The organism cultivated was *Streptococcus cremoris* P2, (NCDO 1995, National Institute for Research in Dairying, Shinfield, Reading, England). The organism was propagated in 10% reconstituted skim milk from a freeze dried ampoule, then subcultured three times (0.1%, 20°C for 18 h) in the experimental medium. The third sub-culture was adjusted to pH 6.6, packed in 1 ml hypodermic syringes and frozen in liquid nitrogen. A working culture was produced for each fermentation by inoculating 1 ml of the thawed culture into 10 ml of experimental medium and incubating at 25°C for 4–5h.

Media a. Culture propagation medium

| Constituents (g/l): | | |
|---|---|---|
| papain digest of skim milk | 25.0 | |
| unneutralized spray dried whey | 50.0 | |
| yeast extract paste (Oxoid) | 1.0 | |

The medium was prepared in 15 litre quantities using tap water, steamed for 3 hours with occasional stirring and placed in a cold room (c.5°C) overnight to allow insoluble matter to precipitate. 10 ml aliquots of clarified medium were dispensed in 1 oz. universal bottles and autoclaved at 121°C for 15 minutes.

b. Diffusion culture medium

The constituents and initial preparation to the cold room stage were exactly as stated for (a). The clarified medium was then transferred to the sterile reservoir vessel and steamed for 3 hours, with occasional agitation. 1.5 liters of the initial clarified medium was transferred to a sterile 2 liter conical flask fitted with aseptic transfer facilities and steamed for 1.5 hours.

Membrane

The diffusion membrane was "Acropor" AN 200, an acrylonitrile-polyvinylchloride copolymer reinforced with nylon of pore size $0.2/^u$. This membrane was chosen because of its rapid diffusion properties, strength and durability.

Apparatus a. Fermenter Vessel

The fermenter was a 1 liter working volume thermostatic reaction vessel provided with a five port lid and bottom inlet port. The vessel was fitted with four polycarbonate baffles. The lid ports comprised of a centrally placed stirrer shaft with a 70 mm paddle stirrer blade, a steam sterilisable, dismountable combination pH probe, a medium filling inlet, a culture outlet, a circulation outlet, an alkali injection needle for pH control and an air filter. Temperature control of the fermenter contents was achieved using a Churchill LTCK thermocirculator connected to the fermenter waterjacket.

b. Reservoir Vessel

The reservoir was a 20 liter Quickfit reaction vessel (FR 20 LF) fitted with a Quickfit MAF3/52 lid, incorporating plugged and sealed inlet and outlet circulation pipes and an air filter. The vessel contents were stirred using a heavy duty magnetic stirrer with a magnetic follower. The growth of chance contaminants was deterred by standing the vessel in a water bath with temperature control unit, held at 15°C. The outer wooden casing of the water bath was removed to effect better magnetic coupling of the stirrer and magnetic follower.

c. Dialyser

Kiil Type Dialyser

A standard Kiil haemodialyser was modified to take two single sheets of membrane providing an effective membrane area of c. 5,500 cm². The modification produced two units consisting of two chambers each, coupled in parallel, and clamped within one frame. Hold-up of each chamber was approximately 175 ml.

d. Circulation Pump

Circulation of the reservoir and fermenter contents through the diffusion units was effected using a two channel flow inducer. Silicone rubber tubing of 9.5 mm bore was used with the prototype units giving maximum flow rates of 3 liters per minute per channel. 7 mm bore silicone rubber tubing was used with the Kiil diffusion unit giving maximum flow rates of 1.5 liters per minute.

e. pH Control Unit

A pH recorder/controller coupled to pH probe, and Delta pump, controlled the pH of the fermenter contents using 10 N ammonium hydroxide.

f. Concentrate Collection System

The concentrate collection vessel was an identical vessel to the fermenter provided with pH control, a thermometer, a direct conduit from the diffusion culture fermenter via an HR flow inducer, and a 70 mm paddle stirrer. The water-jacket cooled the vessel to 0°C by circulating an ice-cold antifreeze solution. The outlet port from the bottom of the vessel was coupled to a manifold constructed from seven 19 G × 2 in hypodermic needles via a 20 cm length of silicone rubber tubing. The tubing was connected to a peristaltic pump. A 4.5 liter Dewar vessel containing liquid nitrogen, and lined with a muslin bag was placed under the manifold for concentrate droplet collection. The distance between the manifold nozzles and the liquid nitrogen surface was maintained at 6 to 7 cm.

Spectrophotometric measurements were taken at 340 nm using a Unicam SP 500 series 2 spectrophotometer. When the optimum cell yield was achieved the concentrated culture was harvested. Stirring (100 rpm) was commenced in the pre-cooled collection vessel and 500 ml of concentrate was pumped from the fermenter after circulation had been stopped and valve 32 and 33 closed. Valve 45 on the collection vessel was opened and concentrate metered at 40–50 ml per minute through the manifold 47, directly into the muslin bag immersed in liquid nitrogen. The surface of the nitrogen was agitated manually to prevent aggregation of frozen concentrate. The frozen granules formed were packed into presterilised and chilled 300 ml polypropylene screw-top jars and stored in liquid nitrogen.

The following results were obtained:

Table 1

| Max. count/ml in time, t (hours) | | | L-lactate concentration (g/l) at | | | |
|---|---|---|---|---|---|---|
| Diffusion | Vol. of fermenter (ml) | t | Fermenter | t | Reservoir | t |
| *1.09 × $10^{11}$ | 1,500 | 25.7 | 22.2 | 27.0 | 12.0 | 27.0 |
| 1.64 × $10^{11}$ | 1,000 | 23.0 | 32.6 | 24.0 | 10.0 | 24.0 |
| 1.8 × $10^{11}$ | 1,000 | 42.5 | N.C. | | N.C. | |
| 1.12 × $10^{11}$ | 1,000 | 24.0 | N.C. | | N.C. | |
| +8.0 × $10^{10}$ | 1,000 | 22.5 | N.C. | | N.C. | |

Presence of entrained air at 18 h reduced the growth rate.
+Cells were harvested at this level, before maximum cell numbers were reached, to ensure high activity for use in small scale bulk starter preparation.
*Lactose analysis revealed 1.29 g/l in the fermenter.
N.C. = Not carried out The diffusion units were sterilised with 250 ppm aqueous sodium hypochlorite and washed with sterile water. The fermenter was sterilised and the fermenter diffusion unit and reservoir connected together under sterile conditions. The fermenter was then filled aseptically, valve 33 being closed. Valves 32 and 33 were then opened, and pump 19 was started to pump at not more than 250 ml per minutes to avoid initial aeration of the medium as air was excluded from the diffusion units and pipes. 1 ml of sterile beef liver catalase containing 20,000 units was injected into the fermenter circulation system to destroy any residual hydrogen peroxide in the medium. After the medium level had been adjusted in the fermenter to the appropriate value, i.e. 1,000 ml minus the hold-up volume of two diffusion chambers and pipes, using valves 32 and 33, the pump rate was increased to approximately 1.3 liters per minute, and stirring commenced at 200 rpm.

The pH of the medium was adjusted to 6.6, whilst the fermenter contents were brought to 22°C using the thermocirculator. 20 ml of a 4–5 h culture of *Streptococcus cremoris* P2 was injected into the fermenter circuit.

After overnight incubation (about 16 h), the fermenter contents were examined every hour by direct microscopic counting using a Helber 0.02 mm working depth counting chamber under phase contrast (X500).

Towards the end of the logarithmic growth phase samples were removed from both the reservoir and fermenter for analysis of L-lactate and lactose concentrations. These samples were kept frozen in liquid nitrogen until required.

L-lactate and lactose estimations were carried out biochemically using Boehringer Mannheim reagents and standard methods.

The average yield of cells produced in diffusion culture was 1.55 × $10^{11}$/ml, the total yield per litre being 1.55 × $10^{14}$ cells. This number of cells was derived from 17 liters of medium, i.e. 1 liter in the fermenter and 16 liters in the reservoir. However, in conventional batch culture with an average cell yield of 2 × $10^9$/ml, the number derived from 17 liters would be 3.4 × $10^{13}$ cells. This is four and a half times fewer cells per unit volume of medium than that achieved by diffusion culture.

EXAMPLE 2

The procedure described in Example 1 was repeated with the exception that the Kiil type dialyser was replaced by a prototype diffusion unit. Two prototype diffusion units (67 cm × 16 cm) were constructed by moulding integral silicone rubber gaskets and chambers using cold curing silicone rubber moulding paste type SR 600 (Esco (Rubber) Ltd., London). The chambers had pyramidal projections to act as membrane supports. The gaskets and chambers were attached to polycarbonate support boards to which the inlet and outlet ports were tapped. Membranes were placed between the gaskets and clamped in steel frames. The protruding membrane supports induced turbulence at low flow rates, this being necessary to facilitate maximum diffusion through the membrane. The two diffusion units were coupled in parallel using 9.5 mm bore silicone rubber tubing to obtain an effective membrane area of approximately 1000 cm². The liquid hold-up was 170 ml per chamber, there being four chambers in all.

For comparative purposes, batch fermentations were carried out using a fermenter substantially as shown in the accompanying drawing using the same materials and the same fermentation conditions of pH, temperature, agitation etc., as were used in the dialysis fermentation. When batch fermentation was carried out, the inoculation was carried out with 1 ml of the 4 to 5 h. culture. To investigate the influence of the alkali on the progress of the fermentation, certain diffusion and batch fermentations were carried out utilising 5 N sodium hydroxide in place of the 10 N ammonium hydroxide. The following results were obtained:

EXAMPLE 4

This Example is carried out in single apparatus substantially as described in the accompanying drawings but utilising a simple diffusion unit having one membrane and two compartments and omitting collection vessel 10 and its associated fitments. The reservoir had Table 2

| Max. count/ml in time, t (hours) | | | | L-lactate concentration (g/l) at time, t (hours) | | | |
|---|---|---|---|---|---|---|---|
| Batch | t | Diffusion | t | Fermenter | t | Reservoir | t |
| $2.12 \times 10^9$* | 15.5 | $2.78 \times 10^{10}$* | 15.5 | N.C. | | N.C. | |
| $1.2 \times 10^9$* | 18.0 | $2.16 \times 10^{10}$* | 22.5 | 10.0 | 23.5 | 4.5 | 23.5 |
| $1.18 \times 10^9$* | 18.0 | $3.88 \times 10^{10}$ | 21.7 | 19.0 | 24.0 | 4.05 | 24.0 |
| $2.6 \times 10^9$* | 19.2 | $3.44 \times 10^{10}$ | 22.5 | 22.0 | 24.7 | 8.0 | 24.7 |
| $2.18 \times 10^9$ | 13.0 | N.C. | | N.C. | | N.C. | |
| N.C. | | $2.24 \times 10^{10}$ | 16.5 | N.C. | | N.C. | |
| N.C. | | $3.1 \times 10^{10}$ | 22.7 | 22.7 | 22.8 | 4.4 | 22.8 |

*Fermentations neutralised with 5 N sodium hydroxide. N.C. Not carried out. Average max. counts per ml in diffusion culture neutralised with sodium hydroxide were $2.42 \times 10^{10}$, but with ammonium hydroxide were $3.22 \times 10^{10}$.

EXAMPLE 3

This example illustrates the use of the frozen granular concentrate to inoculate a sample of milk to simulate bulk starter conditions and thus assess the performance of the concentrated starter produced by diffusion culture. Frozen concentrate granules were checked to ensure a close correlation between the numbers of cells per ml in the liquid state and the numbers of cells per g in the frozen granule state. One gallon of retail pasteurised milk was steamed and held at 100°C for 10 minutes, cooled to 22°C, and inoculated with $2.4 \times 10^{10}$ cells (c. 0.3 g of $8 \times 10^{10}$ cells/ml frozen concentrate). After 17–18 h the acid production was determined by titrating a 10 ml sample to pH. 8.3 with sodium hydroxide. The acid produced was calculated as per cent lactic acid. Similarly, a 10%, 1% and 0.1% inoculum of the bulk starter was incubated in reconstituted skim milk at 30°C for 6 h to determine the activity of the culture. Acid production was calculated in a similar manner. The following results were obtained:

Table 3

| Inoculum | Titrateable acidity in time, t (h) | | 6h titrateable acidity test with inoculum (%) | | |
|---|---|---|---|---|---|
| | % lactic acid | t | 10% | 1% | 0.1% |
| c.$2 \times 10^{10}$ cells | 0.70 | 17.0 | 0.62 | 0.53 | 0.36 |
| c.$2 \times 10^{10}$ cells | 0.65 | 18.5 | N.C. | N.C. | N.C. |
| c.$2 \times 10^{10}$ cells | 0.64 | 17.5 | 0.68 | 0.51 | 0.25 |

N.C. Not carried out.

These results show that small scale bulk starter trials with the concentrate harvested at $8 \times 10^{10}$ cells/ml, used in comparable inocula to those in commercial bulk starter production, attain satisfactory titrateable acidities (0.6 – 0.7% lactic acid) over the incubation period of 17–18 hours. Six hours titrateable acidity tests carried out on the bulk starter also produced satisfactory results.

a working volume of about 1.6 liters, the dialyser a capacity of 10 ml in each compartment and the fermenter a working volume of 80 ml. The fermenter was not stirred and while pH was monitored, means were not provided for automatic pH control by introduction of alkali. The fermenter, dialyser and reservoir were connected to one another by silicone rubber tubing. Dialyser 3 was constructed of transparent plastics material and the membrane was "Visking regular" tubing cut and opened to give a membrane $7.5 \times 28$ cm. The area of the membrane in contact with the liquid was $6.5 \times 18$ cm. A mesh work of a plastics material was provided adjacent to the membrane to induce turbulence in the liquids.

The medium used was a tryptone/lactose/yeast extract broth (TYLE) containing 1.7% by weight tryptone, 1.0% by weight lactose, and 0.3% by weight yeast extract made up in a 20 mM phosphate buffer of pH 6.4.

The apparatus was sterilised by circulating 15% hydrogen peroxide for 15 minutes followed by a 15 minute rinse with sterile Ringers solution. The medium in the reservoir and fermenter was sterilised by autoclaving at 121°C for 20 minutes. The components of the fermenter were assembled aseptically and the medium in the fermenter inoculated with an inoculum containing about $10^5$ viable cells of Streptococcus cremoris (New Zealand strain RI) per ml. The fermenter and reservoir contents were maintained at 30°C and the liquids were circulated through the dialyser at a rate of 250 ml per minute and recycled back to the fermenter and reservoir respectively over a period of 30 hours. After a cultivation time of 30 hours, a cell count of $5 \times 10^{10}$ per ml was obtained and the pH had fallen from 6.4 to 4.0.

We claim:

1. A process for producing a concentrated culture of a microorganism capable of converting lactose substantially completely to lactic acid and in which the culture contains at least $5 \times 10^{10}$ organisms per ml. which comprises
    a. propagating the microorganism in a nutrient medium at a pH of about 6 to 7 in a fermentation zone and circulating nutrient medium containing cultivated microorganism and lactic acid or salts thereof from the fermentation zone to a first chamber of a dialyser, b. introducing a regenerating solution into a second chamber of the dialyser which is separated from the first chamber of the dialyser by a dialysis or diffusion membrane which is substantially impermeable to the micro-organism but which allows the nutrients and the lactic acid and salts thereof to pass through the membrane, said membrane presenting an area of at least 3 cm$^2$ per ml. of nutrient solution containing microorganism, the regenerating solution having a concentration of nutrient which is sufficiently high and a concentration of lactic acid and salts thereof which is sufficiently low so that (i) nutrients pass across the membrane from the regenerating solution to the nutrient medium containing cultivated microorganism and lactic acid or salts thereof, and (ii) lactic acid or salts thereof pass across the membrane from the nutrient medium containing cultivated microorganism and lactic acid or salts thereof to the regenerating solution, c. recirculating to a fermentation zone a nutrient solution containing propagated microorganisms which is enriched in nutrients and depleted in lactic acid or salts thereof, d. continuing the cultivation of the microorganism until there are at least $5 \times 10^{10}$ organisms per ml. in the fermentation zone, and e. thereafter withdrawing a culture containing at least $5 \times 10^{10}$ organisms per ml. from the fermentation zone.

2. A process according to claim 1, wherein there is 12–15 cm$^2$ of membrane per ml of nutrient solution containing micro-organism.

3. A process according to claim 1, wherein nutrient solution containing cultivated micro-organism and lactic acid or salts thereof is continuously circulated to the first chamber of the dialyser and solution enriched in nutrient and depleted in lactic acid or salts thereof continuously recycled back to the fermentation zone.

4. A process according to claim 1, wherein regenerating solution is continuously circulated in a closed circuit from a reservoir to the second chamber of the dialyser.

5. A process according to claim 4, wherein the ratio of the volume of regenerating solution in the closed circuit to the volume of nutrient solution containing cultivated micro-organism is at least 10:1.

6. Process according to claim 1, wherein said culture is withdrawn from the fermentation zone and frozen.

7. A process according to claim 1, wherein the micro-organism is *Streptococcus cremoris*.

8. A process according to claim 1, wherein the pH of the fermenting medium is maintained at 6–7 by addition of sodium hydroxide or ammonium hydroxide.

9. A process according to claim 1, wherein the flow rate of the nutrient medium containing cultivated micro-organism to the first chamber of the dialyser is sufficient to produce turbulent flow at the membrane surface.

10. A method of making cheese which includes the step of inoculating milk with a concentrated culture of micro-organism obtained by a method according to claim 1.

* * * * *